O. D. H. BENTLEY.
BEARING.
APPLICATION FILED OCT. 23, 1912.
1,150,485.
Patented Aug. 17, 1915.
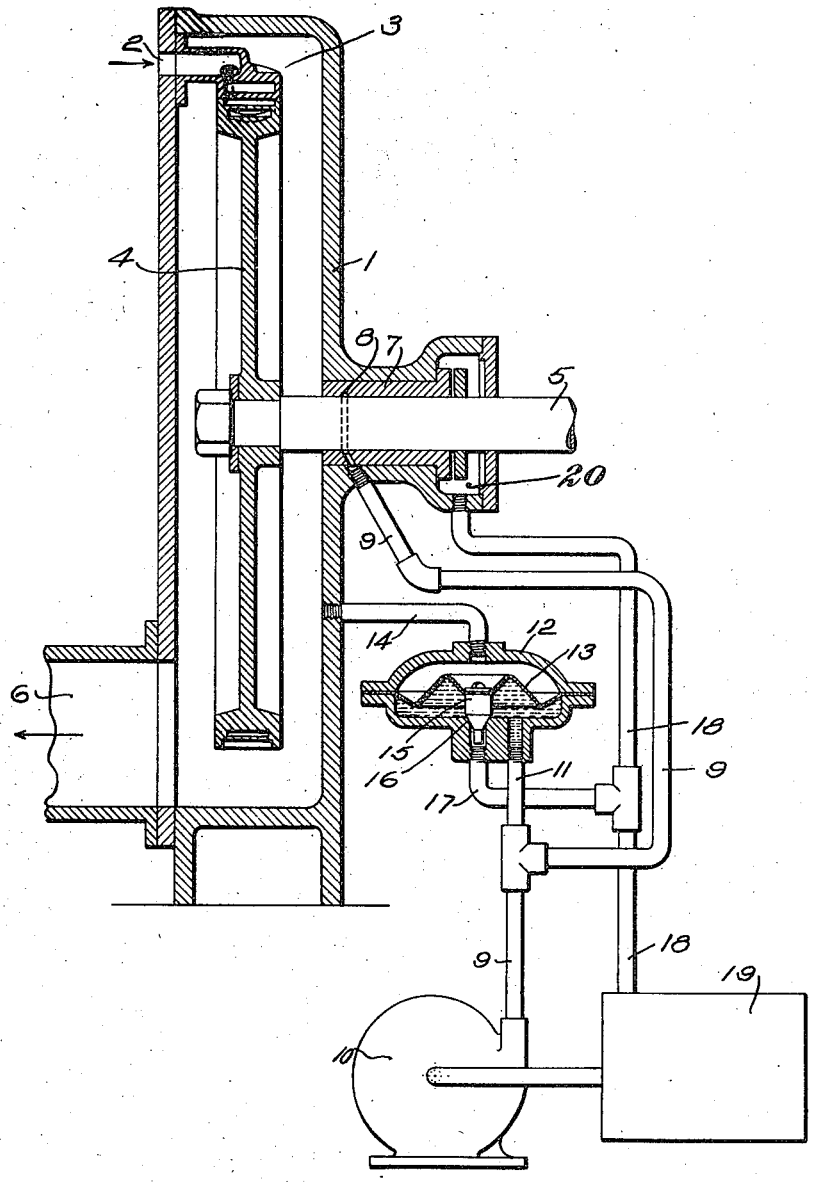

1
UNITED STATES PATENT OFFICE.

OLIVER D. H. BENTLEY, OF BOSTON, MASSACHUSETTS, ASSIGNOR TO B. F. STURTEVANT COMPANY, OF BOSTON, MASSACHUSETTS, A CORPORATION OF MASSACHUSETTS.

BEARING.

1,150,485.

Specification of Letters Patent. Patented Aug. 17, 1915.

Application filed October 23, 1912. Serial No. 727,348.

*To all whom it may concern:*

Be it known that I, OLIVER D. H. BENTLEY, a citizen of the United States, residing at Hyde Park, Boston, in the county of Suffolk and State of Massachusetts, have invented certain new and useful Improvements in Bearings; and I do hereby declare the following to be a full, clear, and exact description of the invention, such as will enable others skilled in the art to which it appertains to make and use the same.

The present invention relates to an improvement in bearings and more particularly to bearings in walls having unequal pressures upon opposite sides.

Heretofore in the construction of turbine engines the bearing for the rotor shaft has been found difficult to maintain supplied with lubricant because of the pressure of the steam in the engine casing, which tends to force the lubricant out through the bearing. In order to produce a construction in which the lubricant is prevented from being forced out by the steam, and in which the steam is prevented from escaping through the bearing, the present invention contemplates supplying lubricant to the bearing under pressure equal to that within the casing, so that the bearing is adequately lubricated and the steam is prevented from escaping through the bearing.

To the above ends the present invention consists in bearings hereinafter described and particularly defined in the claims.

The accompanying drawing illustrates the preferred form of the invention, parts of the apparatus being shown diagrammatically.

The illustrated embodiment of the invention is described as follows:—The engine casing 1 is of the usual form, having a steam inlet 2 which admits steam to the nozzle 3 where it is discharged upon the buckets of the bucket wheel or rotor 4 carried by the shaft 5. The exhaust steam fills the casing and discharges through the exhaust opening 6. The rotor shaft 5 enters the casing through the bearing 7, which is provided with an annular oil groove 8 located in the bearing near the proximal end thereof. This oil groove 8 is supplied with oil by an oil supply pipe 9 which carries oil to the bearing from a pump 10. A branch pipe 11 from the oil supply pipe 9 runs to a pressure regulator 12. The oil is pumped by the pump 10 through the pipe 9 to the bearing 7 for supplying oil thereto under pressure equal to the pressure of the steam in the casing. In order to regulate the pressure at which the oil is supplied to the bearing, and to maintain this pressure the same as that within the casing, the pressure regulator 12 is provided. This pressure regulator consists of a casing having a flexible diaphragm 13, to the upper side of which a pipe 14 affords communication with the inside of the casing of the engine. So the pressure exerted upon the upper side of the diaphragm is equal to the pressure of the steam in the engine casing. To the center of the diaphragm is secured a valve 15 which opens and closes the mouth of the outlet 16 leading through the pipe 17 to the oil return pipe 18 which carries the oil back to the oil reservoir 19. The above described arrangement is such that the oil pump supplying oil to the bearing causes the oil to exert upon the under side of the diaphragm 13 a certain pressure. When the pressure thus exerted is less than that within the engine casing (that is to say, the pressure upon the upper side of the diaphragm 13), the valve 15 holds the outlet 16 closed, and the oil from the pump is forced through the pipe 9 into the bearing, but when the pressure upon the under side of the diaphragm 13 rises to a point where it equals (or exceeds) the pressure in the engine casing, then the diaphragm 13 is lifted so as to open the outlet 16 and permit the oil flowing from the pump through the oil supply pipe 9, the branch pipe 11, and the regulator 12, to flow through the pipe 17 into the return pipe 18. By this apparatus the oil in the bearing is maintained under a pressure which is equal to the pressure of the steam within the engine casing, and wholly irrespective of any fluctuations of pressure in that casing, as the device automatically maintains an equilibrium of pressure between the oil in the bearing and the steam in the casing. So, therefore, the oil being continuously pumped into the bearing, packs the bearing and prevents the escape of steam therethrough. During the operation of the engine the oil gradually works through to the outer end of the bearing, where it is received in an oil trap 20, and from which it flows back through the pipe 18 to the oil reservoir.

The invention, viewed in its broader aspects, contemplates the use of the device as a device for packing for shafts of turbine engines or other machinery wherein a rotating shaft or moving part enters a chamber wherein the pressure is greater than or less than the pressure on the outside. Thus, for example, the invention is adapted for use in connection with pressure blowers, steam engines, vacuum machinery, stage turbines, and the like.

The present invention is not limited to the illustrated embodiment, but may be embodied in other forms within the scope of the following claims:—

1. A bearing for a rotary shaft passing through a wall having unequal pressures upon opposite sides, consisting of a bearing and pressure controlled mechanism for conducting oil to the bearing at such a pressure as to prevent the lubricant from being forced out, substantially as described.

2. A bearing for a rotary shaft passing through a wall having unequal pressures continuously exerted upon opposite sides, having, in combination, a bearing, and a lubricant circulating system provided with pressure regulating mechanism for delivering lubricant to the bearing at a pressure substantially equal to the greater pressure continuously exerted upon the wall.

3. A bearing for a moving part passing through a wall having unequal pressures continuously exerted upon opposite sides, having, in combination, a bearing for the moving part and a tube provided with pressure regulating means for supplying lubricant to the bearing at a pressure substantially equal to the greater pressure continuously exerted upon the wall.

4. A bearing for a moving part passing through a wall having unequal pressures upon opposite sides, having, in combination, a bearing, a pump for pumping oil to the bearing, and means for causing the oil to be supplied to the bearing at substantially the greater of the two pressures exerted upon the opposite sides of the wall, substantially as described.

5. The combination, a pressure chamber, a moving part, a bearing for the moving part in a wall of the chamber, a pump for pumping oil to the bearing, and a regulator for the pump in communication with the chamber so arranged that the oil is supplied to the bearing at substantially the pressure of the chamber.

6. The combination, a pressure chamber, a rotary shaft passing through the wall to said chamber, a bearing surrounding said shaft and means controlled by the pressure of said chamber for conducting the fluid to said bearing to provide a packing for the joint between the bearing and shaft to resist the pressure within the chamber.

7. The combination, a pressure chamber, a moving part passing through the wall of said chamber, a bearing for said moving part and a pressure regulated means for delivering lubricant to said bearing at a point adjacent the pressure chamber side of said bearing at a pressure substantially equal to the pressure of the chamber.

8. The combination of a pressure chamber, a moving part passing through a wall of said chamber, a bearing for said part in the wall of said chamber such that the pressure tends to act within the bearing, a pressure pump for continuously delivering oil to said bearing, and a pressure regulating means for regulating the delivery of oil to the bearing so as to prevent oil from being forced from the bearing into the chamber.

9. The combination of a steam chamber, a rotary shaft, a bearing for the shaft in a wall of said chamber such that the steam pressure tends to act within the bearing, a pump for continuously delivering oil to said bearing, and a regulating means controlled by the pressure in said chamber for so regulating the delivery of oil to the bearing as to prevent the oil from being forced from the bearing into the chamber and contaminating the steam.

OLIVER D. H. BENTLEY.

Witnesses:
HORACE VAN EVEREN,
GEORGE E. STEBBINS.